Nov. 6, 1956 A. D. HILL 2,769,358
HAND ACTUATED PIPE WALL EXTRUSION TOOL
Filed June 30, 1953
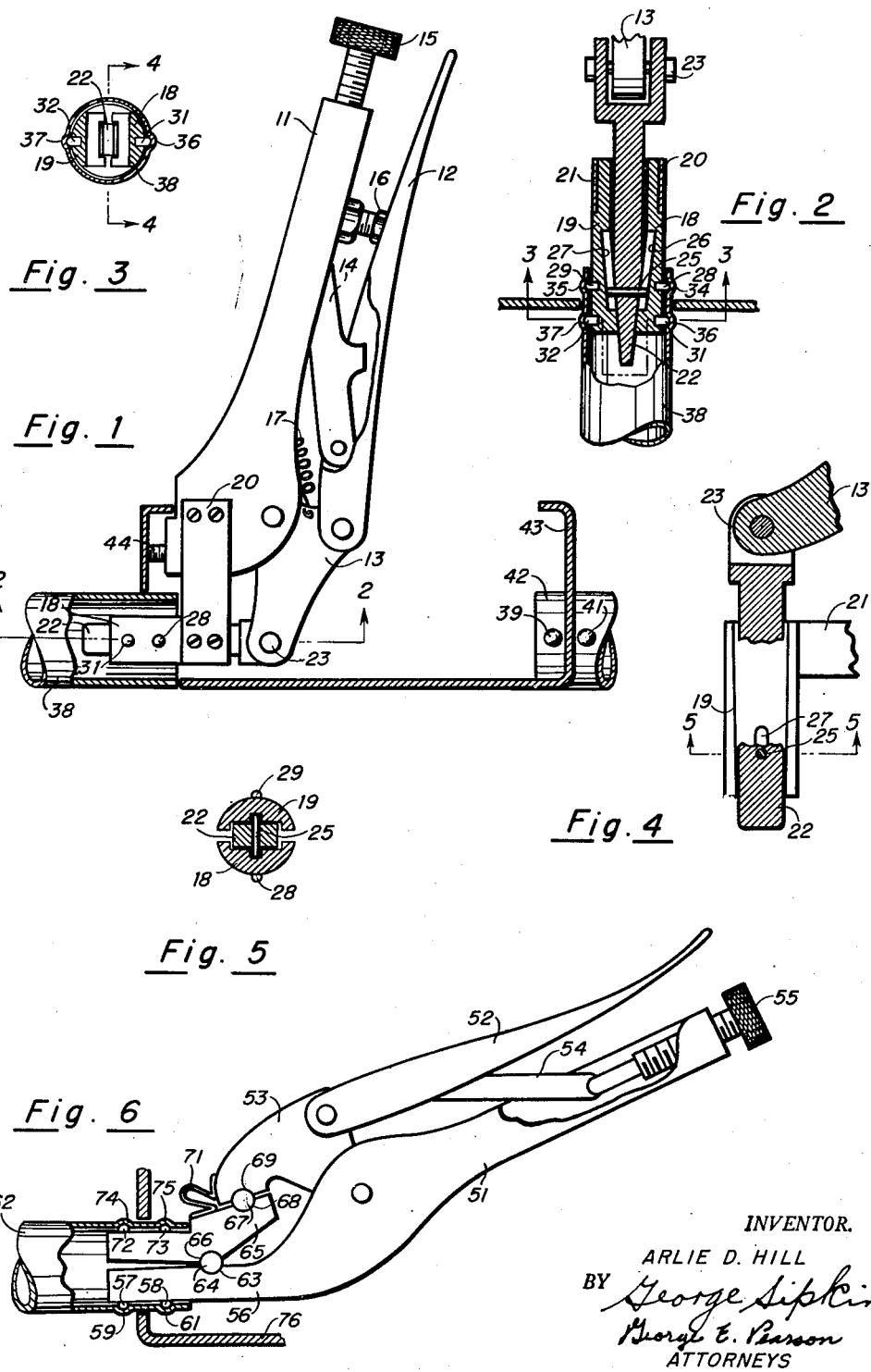
INVENTOR.
ARLIE D. HILL
BY George Sipkin
George E. Pearson
ATTORNEYS

United States Patent Office 2,769,358
Patented Nov. 6, 1956

2,769,358

HAND ACTUATED PIPE WALL EXTRUSION TOOL

Arlie D. Hill, San Diego, Calif.

Application June 30, 1953, Serial No. 365,300

8 Claims. (Cl. 81—15)

(Granted under Title 35, U. S. Code (1952), sec. 266)

The invention described herein may be manufactured and used by or for the Government of the United States of America for governmental purposes without the payment of any royalties thereon or therefor.

This invention relates to an extension tool and more particularly to a tool for forming projections in a pipe conduit on opposite sides of the walls of the conduit box while working from the inside of the pipe conduit and the conduit box.

Numerous tools have been provided for forming protrusions or beads and for flaring and crimping tubular members; however these devices are not adapted to operate within a confined space and form outwardly extending protrusions on a tubular conduit inserted in a small conduit box while operating within the end of the conduit.

Two forms of the present invention are disclosed in the present application, and both forms utilize basically a conventional type of pliers commonly known as the vise-grip type of pliers. In one form the plier mechanism has a pair of protrusions formed on the underside of the lower jaw and another pair of protrusions formed on the upper side of a pivotally mounted upper jaw which has an inner end actuated by the lever mechanism of the pliers so that a squeezing action on the handles of the pliers forces the jaws outwardly with respect to each other and forms protrusions in the end of a pipe conduit in which the jaws are inserted. In the other form of the invention a pair of jaws provided with outwardly extending pairs of protrusions are mounted on opposite sides of a wedge shaped member which is actuated by the lever mechanism of the pliers at an oblique angle with respect to the axis of the handle so that the tool is easily inserted in a small conduit box and can be actuated in the end of a pipe conduit inserted in one of the side walls thereof.

One object of the present invention is to provide an extrusion tool which is simple and economical to construct and is adapted to form outwardly extending protrusions in the end portion of a tubular pipe conduit on opposite sides of the walls of a conduit box.

Another object of the present invention is to provide an extrusion tool which is readily actuated within the restricted space in a small conduit box and is readily inserted in the end of the pipe conduit inserted in an opening in the conduit box for forming outwardly extending protrusions on both sides of the side wall of the conduit box.

Other objects and many of the attendant advantages of this invention will be readily appreciated as the same becomes better understood by reference to the following detailed description when considered in connection with the accompanying drawings wherein:

Fig. 1 is an elevational view of an extrusion tool illustrating one preferred form of the present invention inserted in the end of the pipe conduit positioned in a suitable opening in the conduit box with the conduit and conduit box shown partly in section;

Fig. 2 is a sectional view taken on line 2—2 of Fig. 1;

Fig. 3 is a sectional view taken on line 3—3 of Fig. 2;

Fig. 4 is a sectional view taken on line 4—4 of Fig. 3;

Fig. 5 is a sectional view taken on line 5—5 of Fig. 4; and

Fig. 6 is an elevational view of another preferred form of the present invention.

Referring now to the drawings in detail, the extrusion tool of Fig. 1 utilizes the basic toggle-actuated mechanism of the conventional vise-grip type of pliers, such as those disclosed in the patent to Peterson, No. 2,417,013. The pliers or wrench of the above patent, however, have two opposed jaws which are moved toward each other with a locking engagement for gripping and turning a nut or bolt or similar device.

The extrusion tool of the present invention as shown in Figs. 1 through 5 is provided with a stationary handle 11, a moving handle 12, and a bell crank 13 pivotally connected to the handles 11 and 12 as shown.

A lever 14 is pivotally connected to the moving handle 12 at an intermediate point and also to the lower end of an adjustment screw 15. A stop set screw 16 limits the movement of the moving handle 12.

A spring 17 resiliently urges the handles of the pliers away from each other toward the open position when the toggle formed by the moving handle 12 and the lever 14 is broken.

A pair of extrusion expanding jaws 18 and 19 are resiliently mounted by means of resilient arms 20 and 21 on opposite sides of the stationary handle 11.

The extrusion jaws 18 and 19 are actuated by an expander wedge 22 which is slidably mounted therebetween and pivotally connected at 23 to the lower end of the bell crank 13. The expander wedge 22 has a guide pin 25 slidably mounted in slots 26 and 27 formed in the extrusion jaws 18 and 19 respectively.

The extrusion jaws 18 and 19 may be provided with integrally formed protrusions thereon, but are preferably provided with specially hardened inserts such as the pins 28, 29, 31 and 32 for forming the protrusions or pips 34, 35, 36 and 37 in pipe conduit 38 as shown more clearly in Figs. 2 and 3 and similar to the protrusions 39 and 41 on pipe conduit 42 which has been secured in the opposite side of the conduit box 43.

If desired a stop member 44 may be provided to insure the correct positioning of the tool in the end of the pipe conduit so that the protrusions are formed in the proper position with respect to the wall of the conduit box 43.

A modified form of the present invention is shown in Fig. 6 wherein the operating force is obtained from a mechanism similar to that shown in Figs. 1 through 5 basically similar to the conventional vise-grip type of pliers which provides a very strong force particularly within a certain part of the movement and also a limited movement which cannot go beyond a certain point. This type of mechanism is particularly well adapted for the use to which the present invention is intended, since it is not desirable to extrude or expand the pipe conduit beyond a certain point. A very slight amount of extrusion is all that is necessary to securely hold the thin-wall pipe conduit in position in the wall of the conduit box. In the form of the invention shown in Fig. 6 the stationary handle 51 and the movable handle 52 are pivotally connected to the lever 53 and are also inter-connected by the push lever 54 and an adjusting screw 55.

The stationary handle 51 is extended at its lower portion at any desired angle to form a stationary jaw provided with integrally formed protrusions 57 and 58 which form the protrusions or pips 59 and 61 by extruding the tubular conduit 62.

The lower stationary jaw 56 is provided with an arcuate recess 63 in which the pivot pin 64 is rotatably seated to support the movable rocker jaw 65 engaging an arcuate recess 66 therein. Another pivot pin 67 is seated in a suitable arcuate recess 68 in the rocker jaw and an arcuate recess 69 in the outer end of the lever 53 which transmits the force from the movable handle 52 to the rocker jaw 65. A bow spring 71 is suitably secured to the rocker jaw 65 and to the outer end of lever 53 and serves to maintain these parts in alignment with the lower stationary jaw 56.

The movable rocker jaw 65 is also provided with a pair of spaced integrally formed protrusions 72 and 73 which are adapted to form the pips or protrusions 74 and 75 in the tubular conduit 62 on the opposite side of the wall of the conduit box 76.

The extrusion tool of the present invention is particularly adapted for such use, since it can be very carefully adjusted for the particular size of pipe to provide exactly the degree of extrusion required to hold the pipe conduit securely in the conduit box without unduly distorting the end of the conduit which might in an extreme case cause failure. It will be apparent that other forms of pins or protrusions than those shown could be utilized; for instance, the pins or protrusions could be in the form of wedges with the perpendicular face adjacent the walls of the conduit to form struck-out portions in the pipe conduit.

Obviously many modifications and variations of the present invention are possible in the light of the above teachings. It is therefore to be understood that within the scope of the appended claims the invention may be practiced otherwise than as specifically described.

What is claimed is:

1. An extrusion tool comprising a pair of relatively movable jaws, a pair of spaced outwardly extending protrusions on the opposed outer surfaces of each of said jaws, said jaws having opposed inclined surfaces on the inner portions thereof, a wedge-shaped element slidably mounted between said surfaces, a stationary handle, a movable handle, a bell crank pivotally connected to said stationary handle and said movable handle and to said wedge-shaped element for moving said jaws outwardly with respect to each other when said handles are squeezed together.

2. An extrusion tool as set forth in claim 1 wherein a toggle mechanism is provided between said handles to multiply the force exerted by said jaws on squeezing said handles together, and means for adjusting said toggle mechanism for varying the maximum outward movement of said jaws with respect to each other, and means for limiting the movement of said handles toward each other.

3. An extrusion tool comprising a stationary handle and a movable handle, an adjustment screw movable longitudinally with respect to said stationary handle, a toggle link connecting said adjustment screw on said stationary handle and a pivot point on said movable handle, a bell crank pivotally connected to said stationary handle and said movable handle, a pair of jaws resiliently mounted on opposite sides of said stationary handle, said jaws each having a pair of spaced outwardly extending protrusions on the opposed outer surfaces thereof, said jaws having opposed inclined surfaces on the inner portions thereof, a wedge shaped element slidably mounted between said surfaces, and means pivotally connecting said wedge-shaped member to said bell crank for movement between said jaws to cause outward movement of said jaws with respect to each other, and a stop member adjustably mounted on said stationary handle adjacent said jaws for positioning said jaws with respect to a work piece.

4. An extrusion tool comprising a stationary handle, a movable handle, an adjusting screw mounted on said stationary handle for movement longitudinally thereof, a lever pivotally connecting said adjusting screw and said movable handle, a push lever pivotally connected to said stationary handle and said movable handle to form therewith a toggle mechanism, a stationary jaw formed on the outer end of said stationary handle, a movable jaw pivotally mounted at an intermediate point on said stationary handle for rocking movement thereon, means for transmitting the force from said push lever to the inner end of said movable jaw, and a pair of spaced outwardly extending protrusions on the opposed outer surfaces of the outer end of each of said jaws, whereby said jaws are moved outwardly with respect to each other when said handles are squeezed together.

5. An extrusion tool as set forth in claim 4 wherein a bow spring is secured to said push lever and said movable jaw for resiliently maintaining said movable jaw and said push lever in alignment.

6. An extrusion tool for attaching pipe conduit to a conduit box through a perforation therein comprising a pair of relatively movable jaws whose outer surfaces fit flush longitudinally and in cross section with the interior of the pipe conduit when in extruded position, means on each jaw for spreading circumferential segments of the pipe on either side of said perforation in the box through which the end of the pipe is inserted to form protrusions on the outer surface of said pipe, a first handle operatively connected to at least one of said jaws, a bell crank pivoted to said handle, a movable handle pivotally connected to said first handle and to said bell crank, and means responsive to pivotal movement of said bell crank for effecting relative outward movement of said jaws.

7. An extrusion tool for attaching pipe conduit to a conduit box through a circular perforation therein comprising a split barrel forming semi-cylindrical jaws shaped to conform with the shape of said conduit box perforation, means for spreading said jaws apart a predetermined amount within said pipe conduit to make a press fit of said pipe within the perforation in said conduit box, the outer surface of said jaws adapted to fit flush longitudinally with the interior of said pipe conduit when in expanded position, spaced means on said jaws forming indentations on the interior of said pipe and semispherical protrusions on the exterior surface thereof on either side of said press fit, said means for spreading said jaws apart a pre-determined amount comprising a first handle operatively connected to at least one of said jaws, a bell crank pivoted to said handle, a movable handle pivotally connected to said first handle and to said bell crank, and means on at least one of said jaws responsive to pivotal movement of said bell crank for effecting relative outward movement of said jaws, and stop means to limit the relative movement of said handles.

8. An extrusion tool for attaching pipe conduit to a conduit box through a perforation therein comprising a stationary handle, a pair of relatively movable jaws operatively connected to said handle, a pair of spaced outwardly extending protrusions on the outer surfaces of each of said jaws, actuating means for moving said jaws, said actuating means comprising a bell crank pivoted to said handle, a movable handle pivoted to said bell crank, and means responsive to pivotal movement of said bell crank for effecting relative outward movement of said jaws.

References Cited in the file of this patent

UNITED STATES PATENTS

| 233,797 | Perkins et al. | Oct. 26, 1880 |
| 372,081 | Nebergall et al. | Oct. 25, 1887 |
| 866,644 | Green | Sept. 24, 1907 |
| 1,320,547 | Happensack | Nov. 4, 1919 |
| 2,179,248 | Bandish et al. | Nov. 7, 1939 |
| 2,314,884 | Klein | Mar. 30, 1943 |
| 2,334,781 | Maines | Nov. 23, 1943 |
| 2,341,489 | Tornborg | Feb. 8, 1944 |
| 2,370,733 | Jones | Mar. 6, 1945 |
| 2,370,840 | Carlson | Mar. 6, 1945 |
| 2,405,399 | Bugg et al. | Aug. 6, 1946 |
| 2,618,184 | Goldhart | Nov. 18, 1952 |

FOREIGN PATENTS

| 519,535 | Germany | Feb. 28, 1931 |